US012711980B2

(12) United States Patent
Shoebridge et al.

(10) Patent No.: US 12,711,980 B2
(45) Date of Patent: Aug. 18, 2026

(54) IDENTIFYING SHIFTS IN AUDIO CONTENT VIA MACHINE LEARNING

(71) Applicant: Auddia Inc., Boulder, CO (US)

(72) Inventors: Peter Shoebridge, Boulder, CO (US); Jeffrey Thramann, Boulder, CO (US); Pablo Calderon Rodriguez, Boulder, CO (US)

(73) Assignee: Auddia Inc., Boulder, CO (US)

( * ) Notice: Subject to any disclaimer, the term of this patent is extended or adjusted under 35 U.S.C. 154(b) by 74 days.

(21) Appl. No.: 18/436,143

(22) Filed: Feb. 8, 2024

(65) Prior Publication Data

US 2024/0185878 A1 Jun. 6, 2024

Related U.S. Application Data

(63) Continuation-in-part of application No. 17/123,761, filed on Dec. 16, 2020, now Pat. No. 11,935,520.

(60) Provisional application No. 63/444,449, filed on Feb. 9, 2023, provisional application No. 62/949,228, filed on Dec. 17, 2019.

(51) Int. Cl.
*G10L 25/51* (2013.01)
*G10L 25/27* (2013.01)

(52) U.S. Cl.
CPC .............. *G10L 25/51* (2013.01); *G10L 25/27* (2013.01)

(58) Field of Classification Search
CPC ...... G06F 16/60; G06F 16/634; G06F 16/683; G06F 18/00; G06F 3/0488; G06F 3/165; G06F 9/453; G06F 16/68; G06F 16/686; G06N 3/0464; G06N 3/084; G06Q 30/0267; G10L 15/20; G10L 17/26; G10L 19/018; G10L 25/27; G10L 25/51; G10L 25/78; G10L 17/22; G10L 19/173; G10L 19/20; G10L 21/0364; H03J 1/0058; H04H 20/61; H04H 60/27; H04H 60/375; H04H 20/14; H04H 60/58; H04H 60/64; H04H 60/80; H04N 21/41422; H04N 21/8405; H04N 21/44218; H04N 21/8352; H04R 3/002; A63F 13/355; G10H 1/46; G11B 20/10; G11B 20/10527; G11B 27/038;
(Continued)

(56) References Cited

U.S. PATENT DOCUMENTS 7,174,293 B2 2/2007 Kenyon et al.
8,170,701 B1 * 5/2012 Lu ......................... A63F 13/355 700/94

(Continued)

OTHER PUBLICATIONS

Baluja et al., "Waveprint: Efficient wavelet-based audio fingerprinting," Pattern Recognition 41:3467-3480 (2008).

(Continued)

*Primary Examiner* — Gerald Gauthier
(74) *Attorney, Agent, or Firm* — Husch Blackwell LLP

(57) ABSTRACT

A method and system for identifying the beginning and ending of songs via a machine learning analysis. A machine learning model analyzes streaming audio (such as a radio broadcast) in overlapping, 3-second samples. Each sample is labeled into groups such as "song," "talk," "commercial" and "transition." Based on the location of the transition samples, an exact second a given song begins and ends in the audio stream is derivable. The model further identifies when two songs shift between one another.

20 Claims, 4 Drawing Sheets

(58) Field of Classification Search
CPC ....... G11B 27/28; H04L 65/612; H04L 67/10; H04M 3/53366; H04S 7/308; H04W 4/20
USPC ................ 84/615; 381/2; 455/3.04; 700/94; 704/226, 233, 251; 705/4, 14.58; 707/737, 758
See application file for complete search history.

(56) References Cited

U.S. PATENT DOCUMENTS 8,209,713 B1 6/2012 Lai et al.
8,706,272 B2 * 4/2014 Lindahl .................. G10L 19/20 369/7
8,798,776 B2 * 8/2014 Schildbach ........... G10L 19/173 700/94
8,892,450 B2 * 11/2014 Schildbach ........... G10L 19/173 379/406.01
10,652,298 B2 5/2020 Thomas
11,662,972 B2 * 5/2023 Raikar .................... G10L 25/51 700/94
11,755,273 B2 * 9/2023 Graham .................. H04S 7/308 700/94
11,785,387 B2 * 10/2023 Carrigan ................ G06F 9/453 381/300
11,935,520 B1 * 3/2024 Shoebridge .......... G06N 3/0464
2004/0260682 A1 * 12/2004 Herley .................... G06F 18/00
2005/0126369 A1 * 6/2005 Kirkeby ................. H04H 60/27 84/1
2007/0016918 A1 1/2007 Alcorn
2008/0082510 A1 * 4/2008 Wang .................... G06F 16/683
2009/0053991 A1 * 2/2009 Mantel ................. H04H 60/375 455/3.04
2010/0042412 A1 2/2010 Aronowitz et al.
2010/0198380 A1 * 8/2010 Peiffer ............... H04N 21/8352 700/94
2010/0293072 A1 * 11/2010 Murrant ................. G11B 27/28 705/26.25
2011/0054647 A1 * 3/2011 Chipchase ........ H04M 3/53366 455/566
2011/0075851 A1 * 3/2011 LeBoeuf ................. G10L 25/51 381/56
2011/0196517 A1 * 8/2011 Lindahl .................... G10H 1/46 700/94
2011/0208521 A1 * 8/2011 McClain ................. G10L 17/26 704/E15.001
2012/0053710 A1 * 3/2012 Lindahl .................. G11B 20/10 704/500
2012/0071995 A1 * 3/2012 Topchy .................. H04H 60/58 700/94
2012/0136466 A1 * 5/2012 Weiss .................... G06F 16/634 700/94
2012/0221131 A1 * 8/2012 Wang .................... G06F 16/683 700/94
2013/0024016 A1 * 1/2013 Bhat .................... G11B 27/038 700/94
2013/0211567 A1 * 8/2013 Oganesyan ............. H04W 4/20 700/94
2013/0261781 A1 * 10/2013 Topchy .................. H04H 20/14 700/94
2013/0317635 A1 * 11/2013 Bates ...................... G06F 3/165 700/94
2013/0318087 A1 * 11/2013 Yu .......................... G06F 16/60 707/737
2013/0318114 A1 * 11/2013 Emerson, III ........ G10L 19/018 707/758
2013/0331972 A1 * 12/2013 Sagne ..................... G06F 16/68 700/94
2014/0031960 A1 * 1/2014 Hill ......................... G06F 3/165 700/94
2014/0052770 A1 2/2014 Gran et al.
2014/0195028 A1 * 7/2014 Emerson, III ........ G06F 16/683 700/94
2014/0214190 A1 * 7/2014 Wang .................... G06F 16/686 700/94
2014/0277652 A1 * 9/2014 Watts .................... H04L 65/612 700/94
2014/0277653 A1 * 9/2014 Watts ...................... G06F 3/165 700/94
2014/0288686 A1 * 9/2014 Sant ..................... G11B 27/038 700/94
2014/0336797 A1 * 11/2014 Emerson, III ......... H04H 60/64 700/94
2014/0336798 A1 * 11/2014 Emerson, III ......... H04H 60/80 700/94
2015/0025663 A1 * 1/2015 Cameron ......... H04N 21/44218 700/94
2015/0120336 A1 * 4/2015 Grokop .................. H04R 3/002 705/4
2015/0148928 A1 * 5/2015 Malsbary ............... H04H 20/61 700/94
2015/0199968 A1 * 7/2015 Singhal ............. H04N 21/8405 704/251
2015/0271598 A1 * 9/2015 Thompson ............ H03J 1/0058 381/2
2015/0301791 A1 * 10/2015 Harwood ................ H04L 67/10 700/94
2015/0341410 A1 11/2015 Schrempp et al.
2016/0019876 A1 * 1/2016 Jeffrey ............ H04N 21/41422 700/94
2016/0072599 A1 * 3/2016 Kariyappa ....... G11B 20/10527 700/94
2016/0092926 A1 * 3/2016 Herberger .......... G06Q 30/0267 705/14.58
2016/0125892 A1 * 5/2016 Bowen .................... G10L 15/20 704/226
2016/0140224 A1 * 5/2016 Jin ........................ G06F 16/634 700/94
2017/0301340 A1 * 10/2017 Yassa ...................... G10L 25/27
2018/0121159 A1 5/2018 Thompson et al.
2018/0166066 A1 * 6/2018 Dimitriadis ............. G10L 25/78
2018/0314979 A1 11/2018 Talwar et al.
2019/0102458 A1 * 4/2019 Roblek ................. G06F 16/683
2019/0392852 A1 * 12/2019 Hijazi .................... G06N 3/084
2020/0021375 A1 1/2020 Stavrowski et al.
2020/0251115 A1 * 8/2020 Farinelli ................. G10L 17/22
2020/0412864 A1 * 12/2020 Al Majid ............. G06F 3/0488
2024/0185878 A1 * 6/2024 Shoebridge ............. G10L 25/51

OTHER PUBLICATIONS

Cano et al., "Robust Sound Modeling for Song Detection in Broadcast Audio," Proc. Audio Engineering Society Convention Paper, Presented at the 112th Covention, Munich, Germany pp. 1-7 (May 10-13, 2002).
Herley, "ARGOS: Automatically Extracting Repeating Objects From Multimedia Streams." IEEE Transactions on Multimedia, 8(1):115-129 (publication date: Feb. 2006).
Jung et al., "A Probabilistic Ranking Model for Audio Stream Retrieval," Proceedings of the 1st International Workshop on Multimedia Analysis and Retrieval for Multimodal Interaction pp. 33-38 2016.
Koolagudi et al. "Advertisement Detection in Commercial Radio Channels," 2015 IEEE 10th International Conference on Industrial and Information Systems, ICIIS, 272-277, (publication date: Dec. 18-20, 2015).
Senevirathna et al., "Audio Music Monitoring: Analyzing Current Techniques for Song Recognition and Identification," GSTF Journal on Computing (JoC), 4(3):23-34 (publication date: Oct. 2015).
Senevirathna et al., "Radio Broadcast Monitoring to Ensure Copyright Ownership," International Journal on Advances in ICT for Emerging Regions (publication date: Jul. 2018).
Shah et al., "Efficient Broadcast Monitoring using Audio Change Detection," Proceedings of the Fifth Indian International Conference on Artificial Intelligence, Tumkur, India (2011).
Muller-Cajar, Robin, Univ. of Canterbury, student thesis entitled Detecting Advertising in Radio using Machine Learning, 2007, pp. 1-34. (Year: 2007).

(56) References Cited

OTHER PUBLICATIONS

SHOUTcast XML Metadata Specification, available on archive.org as of Jan. 17, 2016, https://web.archive.org/web/2016011717 4300/http://wiki .shoutcast.com/index.php?title=SHOUTcast_XML_Metadata_Specification&oldid=74966 (Year: 2016).

* cited by examiner

IDENTIFYING SHIFTS IN AUDIO CONTENT VIA MACHINE LEARNING

CROSS-REFERENCE TO RELATED APPLICATION(S)

The present application is a continuation-in-part of U.S. patent application Ser. No. 17/123,761, filed on Dec. 16, 2020, which claims priority to U.S. Provisional Patent Application No. 62/949,228, filed on Dec. 17, 2019, each of which are incorporated herein by reference as if set out in full. The present application also claims priority to U.S. Provisional Patent Application No. 63/444,449, filed on Feb. 9, 2023, the disclosure of which is incorporated by reference as if set out in full.

TECHNICAL FIELD

The disclosure relates to identification of a character of audio content during an audio stream and more specifically to identifying transitions between identifiably different audio content.

BACKGROUND

Radio broadcasts often include segments of music, commentary, and commercials. Listeners are often not interested in listening to the commercial segments. While users may turn down the volume or change the channel, these actions do not occur automatically based on computer analysis. Responses to commercials during radio broadcasts are human intensive.

DETAILED DESCRIPTION

The analysis of an audio stream in order to identify useful fragments of audio via predictions from various machine learning classification engine (e.g., convolutional neural networks (CNN), hidden Markov models, tree-based such as LigthGBM and XGBoost, etc.). In some embodiments, the metadata provided by the stream is further implemented to improve accuracy. The second is used to determine what snippets of audio must be submitted to the machine learning (ML) models and to run a probabilistic analysis on the results from the ML models. Where metadata isn't available the machine learning classification engine makes use of the audio data alone.

A specialized machine learning classification algorithm is trained to classify 3-second samples into categories including: songs, DJ talk, or commercial content. The 3-second samples are represented by using a Mel-Frequency Cepstral Coefficients (MFCCs) feature extraction method based on distributed Discrete Cosine Transform (DCT-II). A second machine learning classification algorithm (binary) is trained to determine whether two 6-second samples belong to the same song. The system uses the second machine learning classification algorithm to identify when there has been a transition between two consecutive songs.

In some embodiments, the information from the audio stream metadata is used to isolate the fragments of audio where the transition between classes or consecutive are very likely to occur and therefore should be analyzed by the suitable ML model. A post-ML analysis based on hidden Markov models (HMM) is performed on the raw sequence of predictions from the ML model. The HMM is constructed from the statistical analysis of hours of radio streams. The result is the most likely label sequence, which the system uses to extract the segments with the desired labels.

Figure 1:
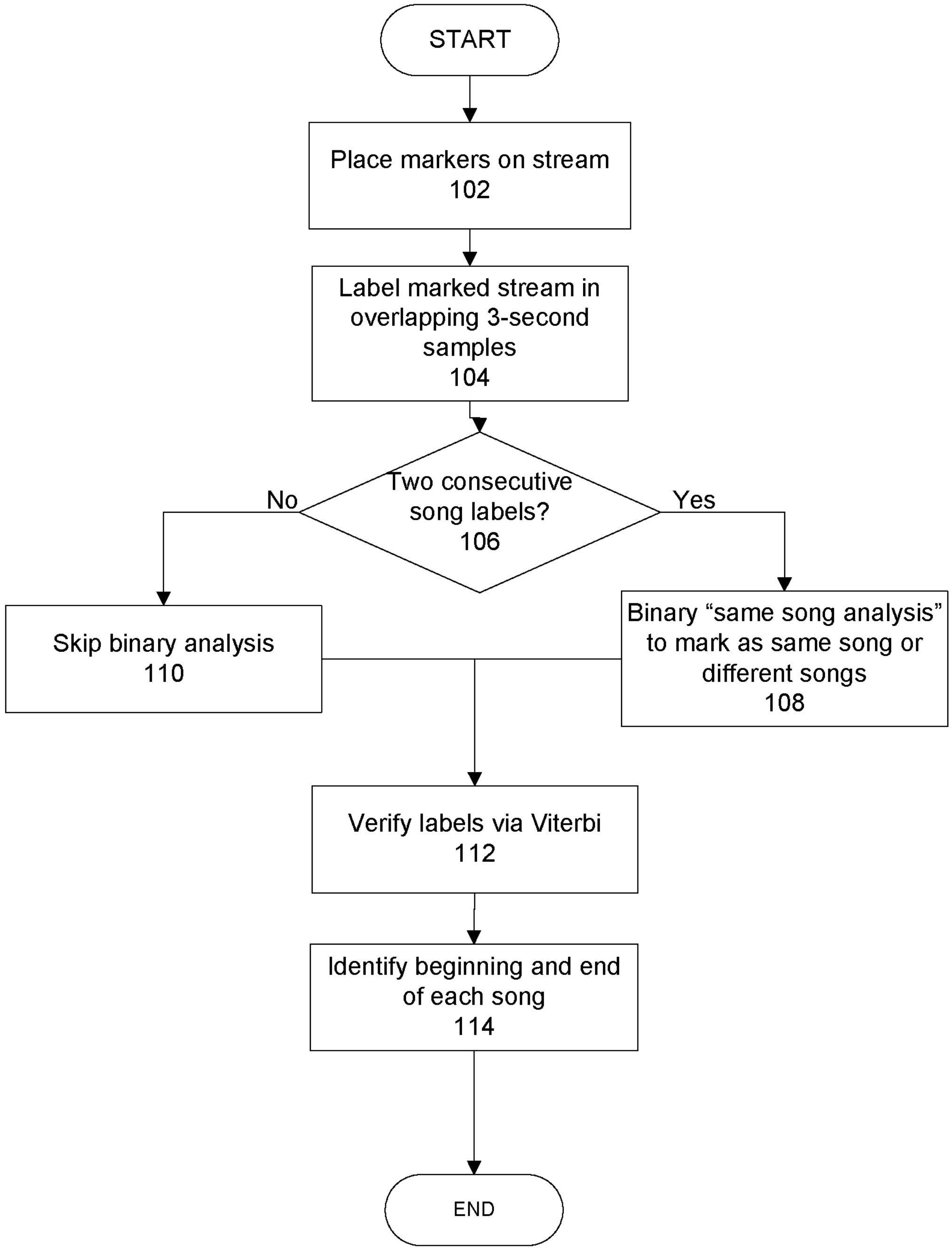
FIG. 1 is a flowchart illustrating a method of identifying the beginning of an audio segment within an audio stream.

FIG. 1 is a flowchart illustrating a method of identifying the beginning of an audio segment within an audio stream. In step 102, the system places markers in the audio stream around which an analyzed segment may start. In some embodiments, the stream metadata provides markers with a known (or at least estimable) degree of uncertainty. The system processes the metadata over a representative sample of audio streams. The markers are placed both before and after the appearance of the metadata. For example, based on one analysis, positioning the markers nineteen seconds before the metadata issues and 29 seconds after the metadata issues has a 0.95 probability to include the beginning of a song. This range may change or be expanded to increase the probability of finding the transition contained in the window. In embodiments that do not make use of metadata, the analysis is performed over all of the audio available, or markers are placed intermittently based on audio identification (e.g., where a song is recognized, a predicted end of the song can be derived from song data and audio markers are placed before and after that predicted end).

In step 104, the system executes ML model(s) of the segment. The model is fed overlapping 3 second samples of audio in 1 second intervals (e.g., 0:00-0:03, 0:01-0:04, and 0:02-0:05). The model outputs a label (e.g., song, talk, commercial) for each sample. The labels are based on the MFCC of each sample.

In step 106, the system identifies whether a previous sample prior to a current sample is labeled as a song. In step 108, where the previous sample of audio is a song, the system inputs pairs of samples of 6-seconds to the binary model. These pairs are created from two 3-second samples that are positioned contiguously (e.g., 0:00-0:03 and 0:03-0:06). 6-second sample sequences pair a sample with the one corresponding to a number of seconds (steps) prior in the sequence. An output of 0 indicates the samples belong to different songs, and 1 indicates the samples belong to the same song.

The binary analysis identifies the second a song transitions to another song. For example, say a song transitions during 0:06. At 0:00-0:03, there is no prior sample to compare, no binary analysis. At 0:01-0:04, the prior sample is a song, but there is no prior contiguous sample, mark as 1. At 0:04-0:07, the prior sample is a song, and the prior contiguous sample 0:00-0:03 is the same song, mark as 1. At 0:05-0:08, the prior sample is a song, and the prior contiguous sample 0:01-0:04 is the same song, mark as 1. At 0:06-0:09, the prior sample is a song, and the prior contiguous sample 0:02-0:05 is no longer the same song, mark as 0. As the first marked 0, the transition between songs begins within the first second of the subject sample, or somewhere between 0:06 and 0:07.

In step 110, where the previous sample is not a song or if there is no previous sample (e.g., the current sample is the first marker in the metadata processed, or there is no assigned state for the previous sample), no binary analysis is performed.

In step 112, the system verifies model output by executing a categorical Viterbi algorithm. From a sufficiently long sequence of raw predictions of labels for consecutive samples from the ML classification engine a probabilistic analysis (via the Viterbi algorithm) is applied to determine the most-likely sequence of labels. Step 112 shifts from independent predictions for individual samples to a sequence of predicted labels. In some embodiments, in addition to the predictions from the ML model, the Viterbi algorithm makes use of observation probabilities, transition probabilities, and initial probabilities.

Observation probabilities (OP). A matrix that expresses the correlation between the predicted labels and the actual sample label. Each model (state classification or binary) has its own respective OP matrix and it is inferred from the machine learning process and provided to the system.

Transition probabilities (TP). A matrix that expresses the probability of changing from one state to another (or remain in the same state) given two consecutive samples. These probabilities are inferred from existence of known transitions (and probably only one) in the analyzed time window. Formulas to calculate the probabilities are identified for each possible transition. Transitions are identified in table 1 for the state model and table 2 for the binary model.

TABLE 1

| | | |
|---|---|---|
| song to song prob. | song to ad prob. | song to transition prob. |
| ad to song prob. | ad to ad prob. | ad to transition prob. |
| transition to song prob. | transition to ad prob. | transition to transition prob. |

"transition" in context of the table refers to a given 3 second sample that includes two states.

TABLE 2

| | |
|---|---|
| mismatch to mismatch prob. | mismatch to match prob. |
| match to mismatch prob. | match to match prob. |

Initial probabilities (IP) are an array with the probability of each state in the first sample. This is inferred from the knowledge of the most likely previous state. If the previous state is unknown, then assign equal probabilities to each state. These arrays are known to the system for each possible transition.

In order to provide an acceptable accuracy, the Viterbi algorithm makes use of a certain number of raw predictions back (e.g., 30 seconds look back) and ahead (e.g., 20 seconds look ahead) of the predictions that are being verified according to the model, which means the analysis is performed some amount of time behind the real stream (e.g., 20 seconds).

At the beginning of streaming audio, there are no predictions to look back. Thus, the system starts with 0 look back, and increments until the system reaches 30 seconds. From that point on, the system feeds the last 30 seconds before the predictions being verified, or "smoothed." That is, at time t, to verify time t−20, the system uses predictions from t−50 to t.

In step 114, the system identifies the beginning and end of each song based on the assigned states from the ML classification. The ML classification engine identifies transitions by finding consecutive samples with different labels in the generated most-likely sequence of labels. Most transitions that begin or end songs are present in three samples. The last second of a first sample, the second (numerical) second (temporal) of the second sample, and the first second of a third sample. Where there are three samples including a transition, the beginning of a song is narrowed to a second of air time based on the one second those three samples have in common. Where the transition is present in fewer samples (e.g., because the samples are at the beginning or end of a segment), the exact second is still derivable based on the overlap and the exclusion of overlap with other samples. Once the exact second a transition occurs is identified, the system may perform a similar analysis of smaller gaps in time (fractions of a second) in order to identify when during that second the transition occur in order to make precise cuts in the audio segment.

Figure 2:
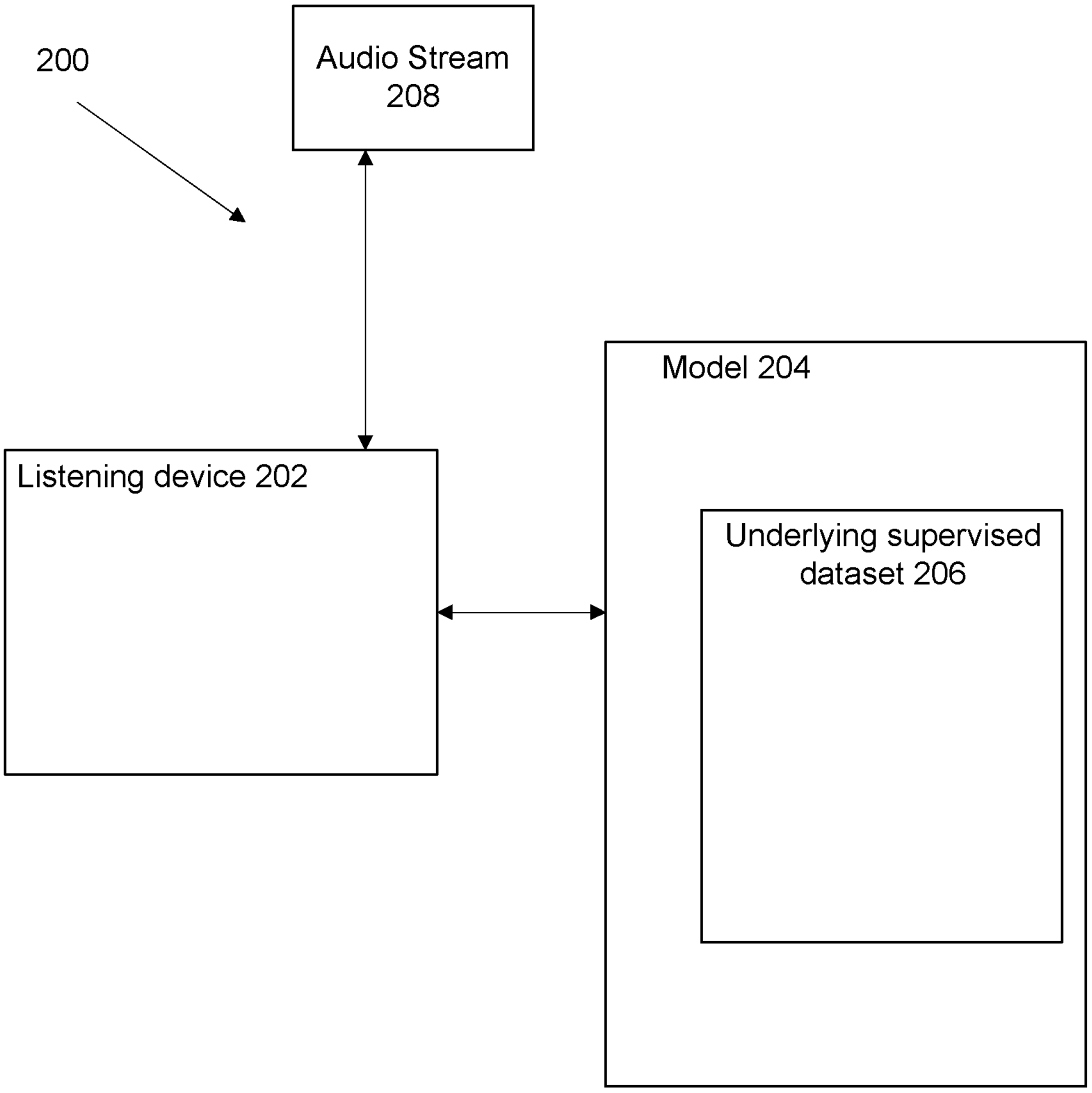
FIG. 2 is a block diagram of an audio analysis system.

FIG. 2 is a block diagram of an audio analysis system 200. The audio analysis system 200 includes a listening device 202 that communicates with a machine learning model 204. The machine learning model 204 includes an underlying supervised dataset 206. An audio stream 208 is fed into the listening device 202 which communicates the audio stream in 3-second samples to the model 204.

The underlying supervised dataset 206 includes a significant number of 3-second samples arranged in order and given human-provided labels associated with an observed MFCC. The samples are arranged in consecutive order in the underlying supervised dataset in order to train label transition probabilities for the Viterbi algorithm. The underlying supervised dataset 206 may include additional details associated with samples including time or day and station classification.

Figure 3:
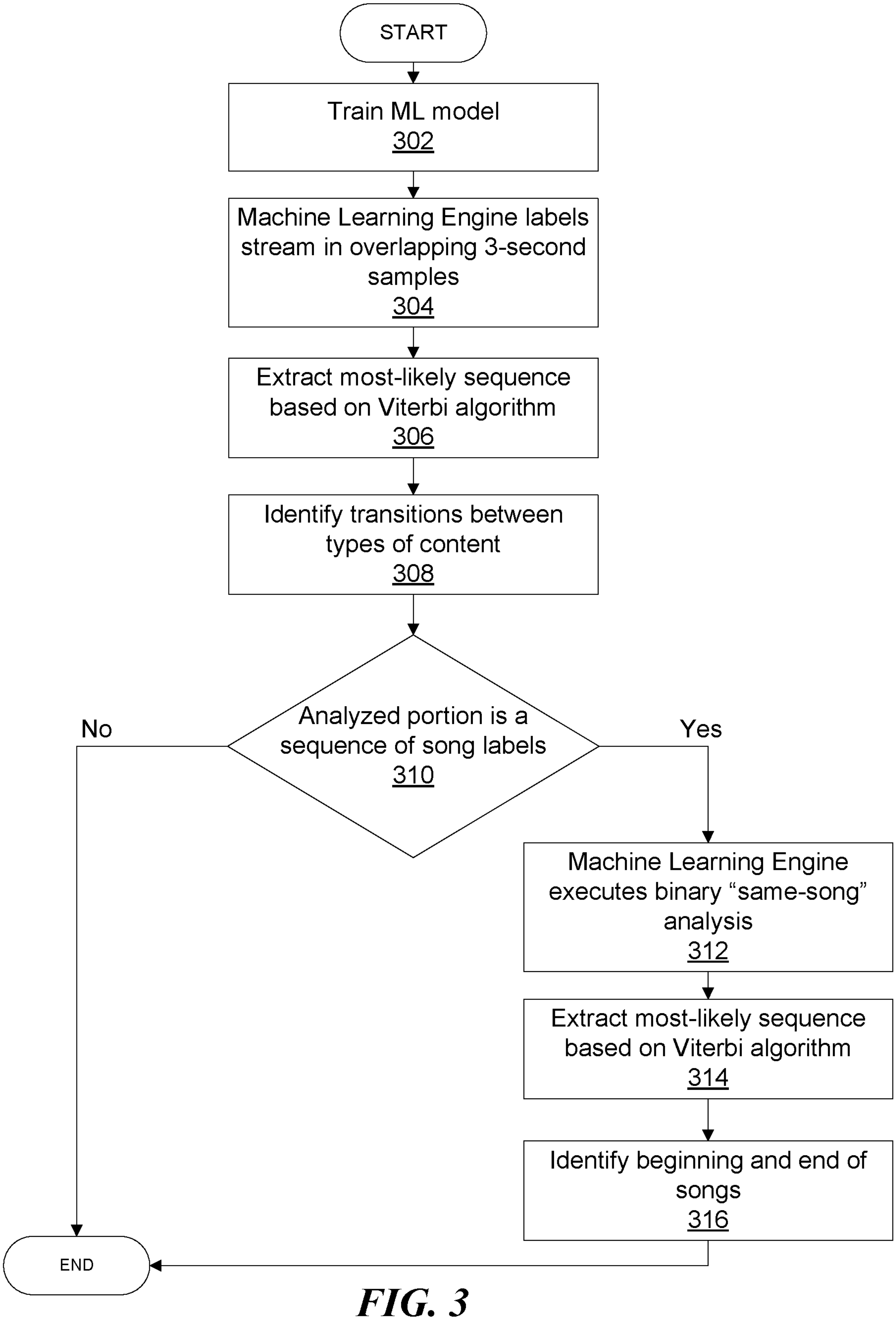
FIG. 3 is a flowchart illustrating a method of generating a labeling sequence and identifying transitions between songs.

FIG. 3 is a flowchart illustrating a method of generating a labeling sequence and identifying transitions between songs. In step 302, the platform trains the machine learning classification engine. The ML classification engine is implemented to label segments of audio as song, talk, or ads. Radio streams often divide audio quality into three tiers:

- Low-quality including: AAC HE (high efficiency) compressed audio below 48 kbs, AAC LC (low complexity) below 96 Kbs, and MP3 below 96 kbs.
- Mid-quality including: AAC HE compressed audio that goes from 48 kbs to 96 kbs, and MP3 at 96 kbs or above (although the cutoff for MP3 is a little less clear).
- High-quality including: AAC compressed above 96 kbs, MP3 about approximately 128 kbs or higher, and uncompressed PCM audio.

While various embodiments train on different quality audio, at the time of submission, mid-quality audio captures a significant majority of radio streams. Accordingly, training on mid-quality audio is effective in most circumstances. An example set of training data includes 55,000, 6-second segments from mid-quality stations, roughly yielding the following:

- 30,000 segments labeled as MUSIC (35 minutes of each radio hour),
- 12,750 segments labeled as ADS (15 minutes of each radio hour)
- 8,250 segments labeled as TALK (10 minutes of each radio hour)
- 2,750 segments labeled as mixed (5% of all 55,000 segments)

These segments are pre-labeled and fed to the model as training data. A given embodiment of the machine learning classification engine employs more or less training data than the above example and has a corresponding effect on the resultant accuracy of the engine.

In step 304, the system executes ML model(s) of a given segment of audio. The model is fed overlapping 3 second samples of audio in 1 second intervals (e.g., 0:00-0:03, 0:01-0:04, and 0:02-0:05). The model outputs a label (e.g., song, talk, commercial) for each sample. The labels are based on the MFCC of each sample.

In step 306, the system verifies model output by executing a categorical Viterbi algorithm. From the sequence of consecutive raw predictions of labels on the segment of audio as identified via the ML classification engine the platform applies a probabilistic analysis (via the Viterbi algorithm) to determine the most-likely sequence of labels. Step 306 shifts from independent predictions for individual samples to a sequence of predicted labels.

The probabilistic correction (via Viterbi) of the sequence of labels corrects for machine learning errors that occur on evaluations of individual samples. When a given sample outputs as a commercial label in the middle of a long string of talk labels, there is an apparent issue that a probabilistic analysis corrects. The probabilistic correction operates on patterns within the sequence of labels and corrects those that do not fit the interpretation by the trained model.

In step 308, The platform identifies transitions between types of content. That is, identifications of the locations where one the labels of adjacent samples alter between labels (e.g., song, talk, commercial). In step 310, the platform determines whether further analysis to identify transitions between different songs needs to be performed. For sub segments of the whole that have a sequence of differing labels, no further analysis is needed. However, where a portion of the sequence includes a number of consecutive song labels, further analysis is performed.

In some embodiments, sub-segments are identified via chunking, or heuristics. An example heuristic is that the average song of a given genre tends to be of a known average length. When that average is exceeded by a sequence of consecutive song labels, that sequence is analyzed for on a same-song analysis. The genre of the song may be assumed based on the radio station from which the sequence of song labels originated. A chunking approach simply applies the analysis to chunks of labels of a predetermined sequence length (e.g., every 3, 4, or 5 minutes).

Where an analyzed portion or sequence does include a sequence of consecutive song labels, in step 312, the machine learning classification engine executes a binary analysis on whether each sample is the same song as adjacent samples. In the binary analysis, the system inputs pairs of samples of 6-seconds to the binary model. These pairs are created from two 3-second samples that are positioned contiguously (e.g., 0:00-0:03 and 0:03-0:06). 6-second sample sequences pair a sample with the one corresponding to a number of seconds (steps) prior in the sequence. In a given embodiment, an output of 0 indicates the samples belong to different songs, and 1 indicates the samples belong to the same song.

The binary analysis identifies the second a song transitions to another song. For example, say a song transitions during 0:06. At 0:00-0:03, there is no prior sample to compare, no binary analysis. At 0:01-0:04, the prior sample is a song, but there is no prior contiguous sample, mark as 1. At 0:04-0:07, the prior sample is a song, and the prior contiguous sample 0:00-0:03 is the same song, mark as 1. At 0:05-0:08, the prior sample is a song, and the prior contiguous sample 0:01-0:04 is the same song, mark as 1. At 0:06-0:09, the prior sample is a song, and the prior contiguous sample 0:02-0:05 is no longer the same song, mark as 0. As the first marked 0, the transition between songs begins within the first second of the subject sample, or somewhere between 0:06 and 0:07.

In step 314, the system again verifies model output by executing a probabilistic analysis (via the Viterbi algorithm). From the sequence of consecutive binary values for consecutive segments, the platform determines the most-likely sequence of labels (0 or 1). In practice, execution of the Viterbi algorithm weeds out false positives and negatives. If the sequence presents correctly (in an embodiment that makes use of two contiguous, 3-second samples), a transition appears to be a series of 1's followed by five 0's and then a return to a series of 1's. A lone 0 is out of place and likely an error. The Viterbi algorithm corrects such issues.

In step 316, based on the most likely sequence of the same-song analysis the platform identifies the bounds of a given song. For example, a sequence looks like: 1 1 1 1 1 1 0 0 0 0 0 1 1 1 1 1. The platform derives that the comparison indicated by the third 0 (the middle one) is indicative of each compared sample being substantially a different song.

The above example is a particularly clean one in that the ML engine and Viterbi algorithm output a completely accurate set of data. In the clean example, there are five 0's because at least 1 second of the 6 seconds includes a song that is different than at least 1 other second of the sample. If one of those comparisons adjacent to the series of five 0's has a false positive or negative thus rendering a series of four or six 0's there is no longer a middle 0 to identify the second of transition. Thus, an embodiment of the platform makes use of a confidence score on each of the binary comparisons to identify the point of transition.

Figure 4:
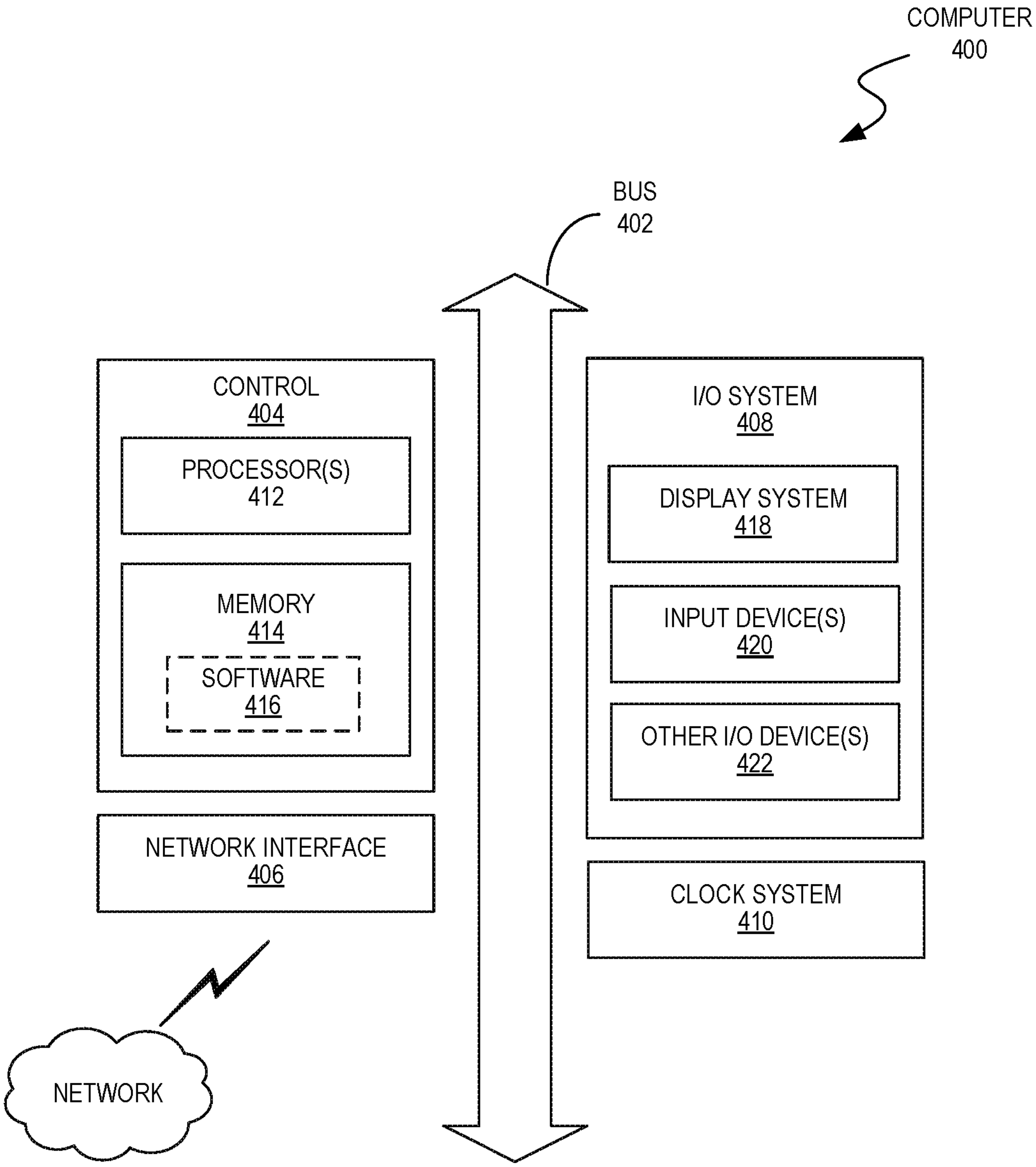
FIG. 4 is a block diagram of a computer operable to implement the disclosed technology according to some embodiments of the present disclosure.

FIG. 4 is a block diagram of a computer 400 operable to implement the disclosed technology according to some embodiments of the present disclosure. The computer 400 may be a generic computer or a computer specifically designed to carry out features of the translation system. For example, the computer 400 may be a system-on-chip (SOC), a single-board computer (SBC) system, a desktop or laptop computer, a kiosk, a mainframe, a mesh of computer systems, a handheld mobile device, or combinations thereof.

The computer 400 may be a standalone device or part of a distributed system that spans multiple networks, locations, machines, or combinations thereof. In some embodiments, the computer 400 operates as a server computer or a client device in a client-server network environment, or as a peer machine in a peer-to-peer system. In some embodiments, the computer 400 may perform one or more steps of the disclosed embodiments in real time, near real time, offline, by batch processing, or combinations thereof.

As shown in FIG. 4, the computer 400 includes a bus 402 that is operable to transfer data between hardware components. These components include a control 404 (e.g., processing system), a network interface 406, an input/output (I/O) system 408, and a clock system 410. The computer 400 may include other components that are not shown nor further discussed for the sake of brevity. One who has ordinary skill in the art will understand elements of hardware and software that are included but not shown in FIG. 4.

The control 404 includes one or more processors 412 (e.g., central processing units (CPUs)), application-specific integrated circuits (ASICs), and/or field-programmable gate arrays (FPGAs), and memory 414 (which may include software 416). For example, the memory 414 may include volatile memory, such as random-access memory (RAM), and/or non-volatile memory, such as read-only memory (ROM). The memory 414 can be local, remote, or distributed.

A software program (e.g., software 416), when referred to as "implemented in a computer-readable storage medium," includes computer-readable instructions stored in the memory (e.g., memory 414). A processor (e.g., processor 412) is "configured to execute a software program" when at least one value associated with the software program is stored in a register that is readable by the processor. In some embodiments, routines executed to implement the disclosed embodiments may be implemented as part of an operating system (OS) software (e.g., Microsoft Windows® and Linux®) or a specific software application, component, program, object, module, or sequence of instructions referred to as "computer programs."

As such, the computer programs typically comprise one or more instructions set at various times in various memory devices of a computer (e.g., computer 400), which, when read and executed by at least one processor (e.g., processor 412), will cause the computer to perform operations to execute features involving the various aspects of the disclosed embodiments. In some embodiments, a carrier containing the aforementioned computer program product is provided. The carrier is one of an electronic signal, an optical signal, a radio signal, or a non-transitory computer-readable storage medium (e.g., memory 414).

The network interface 406 may include a modem or other interfaces (not shown) for coupling the computer 400 to other computers over the network. The I/O system 408 may operate to control various I/O devices, including peripheral devices, such as a display system 418 (e.g., a monitor or touch-sensitive display) and one or more input devices 420 (e.g., a keyboard and/or pointing device). Other I/O devices 422 may include, for example, a disk drive, printer, scanner, or the like. Lastly, the clock system 410 controls a timer for use by the disclosed embodiments.

Operation of a memory device (e.g., memory 414), such as a change in state from a binary one (1) to a binary zero (0) (or vice versa), may comprise a visually perceptible physical change or transformation. The transformation may comprise a physical transformation of an article to a different state or thing. For example, a change in state may involve accumulation and storage of a charge or a release of a stored charge. Likewise, a change of state may comprise a physical change or transformation in magnetic orientation or a physical change or transformation in molecular structure, such as a change from crystalline to amorphous or vice versa.

Aspects of the disclosed embodiments may be described in terms of algorithms and symbolic representations of operations on data bits stored in memory. These algorithmic descriptions and symbolic representations generally include a sequence of operations leading to a desired result. The operations require physical manipulations of physical quantities. Usually, though not necessarily, these quantities take the form of electric or magnetic signals that are capable of being stored, transferred, combined, compared, and otherwise manipulated. Customarily, and for convenience, these signals are referred to as bits, values, elements, symbols, characters, terms, numbers, or the like. These and similar terms are associated with physical quantities and are merely convenient labels applied to these quantities.

While embodiments have been described in the context of fully functioning computers, those skilled in the art will appreciate that the various embodiments are capable of being distributed as a program product in a variety of forms and that the disclosure applies equally, regardless of the particular type of machine or computer-readable media used to actually effect the embodiments.

While the disclosure has been described in terms of several embodiments, those skilled in the art will recognize that the disclosure is not limited to the embodiments described herein and can be practiced with modifications and alterations within the spirit and scope of the invention. Those skilled in the art will also recognize improvements to the embodiments of the present disclosure. All such improvements are considered within the scope of the concepts disclosed herein. Thus, the description is to be regarded as illustrative instead of limiting.

From the foregoing, it will be appreciated that specific embodiments of the invention have been described herein for purposes of illustration, but that various modifications may be made without deviating from the scope of the invention. Accordingly, the invention is not limited except as by the appended claims.

We claim:

1. A method for classifying segments of an audio stream of a radio program comprising:

labeling a plurality of consecutive audio samples of the audio stream with a trained machine learning model via successive inspection, the trained machine learning model configured to output a label corresponding to each audio sample indicating whether each respective audio sample is a song portion, a talk portion, or a commercial portion of the audio stream resulting in a sequence of labels;

executing a first probabilistic correction on the sequence of labels based on patterns represented within the sequence of labels and resulting in a corrected sequence of labels;

identifying a set of consecutive audio samples as having song portion labels; and determining, via the trained machine learning model, whether the set of consecutive audio samples are a matching song.

2. The method of claim 1, further comprising:

in response to identification that the set of consecutive audio samples belong to different songs, determining, via the trained machine learning model, a transition time between two different songs through use of consecutive overlapping audio samples.

3. The method of claim 2, wherein determining the transition time between the two different songs includes executing a second probabilistic correction on a sequence of comparisons of contiguous audio samples.

4. The method of claim 2, wherein the transition time between the two different songs further comprises:

comparing a set of contiguous audio samples of the plurality of audio samples.

5. The method of claim 1, wherein the plurality of consecutive audio samples are overlapping.

6. The method of claim 2, wherein said determining the transition time further includes:

inserting a marker at an end of a song where the consecutive audio samples transition between songs.

7. The method of claim 1, wherein the successive inspection of consecutive audio samples further comprises:

advancing a frame of inspection by a temporal period that is shorter than a temporal length of each audio sample.

8. The method of claim 6, wherein the successive inspections overlap by 1 second.

9. A computing device for classifying segments of an audio stream of a radio program comprising:

a processor; and a non-transitory computer-readable medium having stored thereon instructions that, when executed by the processor, cause the processor to perform operations including:

label a plurality of consecutive audio samples of the audio stream with a trained machine learning model via successive inspection, the trained machine learning model configured to output a label corresponding to each audio sample indicating whether each respective audio sample is a song portion, a talk portion, or a commercial portion of the audio stream resulting in a sequence of labels;

execute a first probabilistic correction on the sequence of labels based on patterns represented within the sequence of labels and resulting in a corrected sequence of labels;

identify a set of consecutive audio samples as having song portion labels; and determine, via the trained machine learning model, whether the set of consecutive audio samples are a matching song.

10. The computing device of claim 9, the instructions further comprising:

in response to identification that the set of consecutive audio samples belong to different songs, determining, via the trained machine learning model, a transition time between two different songs through use of consecutive overlapping audio samples.

11. The computing device of claim 10, wherein determining the transition time between the two different songs includes executing a second probabilistic correction on a sequence of comparisons of contiguous audio samples.

12. The computing device of claim 10, wherein the transition time between the two different songs further comprises:

comparing a set of contiguous audio samples of the plurality of audio samples.

13. The computing device of claim 9, wherein the plurality of consecutive audio samples are overlapping.

14. The computing device of claim 10, wherein said determining the transition time further includes:

inserting a marker at an end of a song where the consecutive audio samples transition between songs.

15. A non-transitory computer-readable medium having stored thereon instructions that, when executed by one or more processors, cause the one or more processor to perform operations for classifying segments of an audio stream of a radio program comprising:

labeling a plurality of consecutive audio samples of the audio stream with a trained machine learning model via successive inspection, the trained machine learning model configured to output a label corresponding to each audio sample indicating whether each respective audio sample is a song portion, a talk portion, or a commercial portion of the audio stream resulting in a sequence of labels;

executing a first probabilistic correction on the sequence of labels based on patterns represented within the sequence of labels and resulting in a corrected sequence of labels;

identifying a set of consecutive audio samples as having song portion labels; and determining, via the trained machine learning model, whether the set of consecutive audio samples are a matching song.

16. The non-transitory computer-readable medium of claim 15, the instructions further comprising:

in response to identification that the set of consecutive audio samples belong to different songs, determining, via the trained machine learning model, a transition time between two different songs through use of consecutive overlapping audio samples.

17. The non-transitory computer-readable medium of claim 16, wherein determining the transition time between the two different songs includes executing a second probabilistic correction on a sequence of comparisons of contiguous audio samples.

18. The non-transitory computer-readable medium of claim 16, wherein the transition time between the two different songs further comprises:

comparing a set of contiguous audio samples of the plurality of audio samples.

19. The non-transitory computer-readable medium of claim 15, wherein the plurality of consecutive audio samples are overlapping.

20. The non-transitory computer-readable medium of claim 16, wherein said determining the transition time further includes:

inserting a marker at an end of a song where the consecutive audio samples transition between songs.

* * * * *